United States Patent [19]

Jay et al.

[11] Patent Number: 5,014,033

[45] Date of Patent: May 7, 1991

[54] DIELECTRIC LIQUID COMPOSITIONS CONTAINING HYDROXYBENZALDEHYDE

[75] Inventors: Pierre Jay, Saint-Didier Au Mont D'Or; Noelle Berger, Ecully, both of France

[73] Assignee: Atochem, Puteaux, France

[21] Appl. No.: 413,189

[22] Filed: Sep. 27, 1989

[30] Foreign Application Priority Data

Sep. 30, 1988 [FR] France ................................ 88 12843

[51] Int. Cl.[5] ........................ H01F 27/12; H01G 4/22; H01B 3/20

[52] U.S. Cl. ........................................ 336/94; 252/570; 252/573; 252/578; 252/579; 252/581; 174/17 LF; 361/319; 503/213

[58] Field of Search ............... 252/578, 570, 573, 579, 252/581; 503/213; 174/17 LF, 25 R, 25 C; 336/94, 58; 361/315, 317, 318, 319, 327

[56] References Cited

U.S. PATENT DOCUMENTS 3,844,968 10/1974 Jay ........................................ 252/581
3,928,705 12/1975 Loft et al. ............................ 252/578
4,018,693 4/1977 Mead et al. .......................... 252/578
4,276,184 6/1981 Mandelcorn et al. .............. 252/579
4,347,169 8/1982 Sato et al. ............................ 252/570
4,401,871 8/1983 Lloyd et al. .......................... 252/581
4,506,107 3/1985 Sato et al. ............................ 252/510
4,549,034 10/1985 Sato et al. ............................ 252/570
4,679,119 7/1987 Saedigian ............................ 252/579

FOREIGN PATENT DOCUMENTS 0012579 6/1980 European Pat. Off. .
2352450 4/1975 Fed. Rep. of Germany .
777811 6/1957 United Kingdom .

OTHER PUBLICATIONS

*Current Science*, vol. 53, No. 7, pp. 366–367, Apr. 5, 1984.

*Primary Examiner*—Paul Lieberman
*Assistant Examiner*—Christine A. Skane
*Attorney, Agent, or Firm*—Burns, Doane, Swecker & Mathis

[57] ABSTRACT

Novel dielectrically improved liquid compositions include at least one electrical insulating oil (A), e.g., benzyltoluene or oligomers thereof, and at least one aldehyde (B) containing at least six carbon atoms, or a functionally substituted such aldehyde, e.g., 3-ethoxy-4-hydroxybenzaldehyde.

19 Claims, No Drawings

DIELECTRIC LIQUID COMPOSITIONS CONTAINING HYDROXYBENZALDEHYDE

BACKGROUND OF THE INVENTION

Field of the Invention

The present invention relates to novel compositions of matter and to their use as dielectric liquid electrical insulators. This invention more especially relates to insulating oils/compositions which are well suited for inclusion in electrical transformers and capacitors. THe oils, per se, are described, for example, in European Patent EP 8,251 and in U.S. Pat. No. 4,523,044.

SUMMARY OF THE INVENTION

It has now unexpectedly been found that the dielectric properties of the prior art insulating oils can be greatly improved when small amounts of certain compounds are added thereto.

Briefly, the present invention features novel compositions comprising at least one electrical insulating oil (A) and at least one compound (B) containing at least 6 carbon atoms, bearing an aldehyde functional group, but not more than two hydroxyl groups.

By "electrical insulating oil (A)" are intended all materials which are useful for insulating electrical transformers and capacitors. These are materials which are liquid at the temperatures of utilization, namely, at temperatures ranging from −40° to 100° C., or as soon as the temperature exceeds a value ranging from ambient temperature to 100° C. These materials have a resistivity of at least $10^{10}$ Ω cm and preferably higher than $10^{12}$ Ω cm.

DETAILED DESCRIPTION OF THE PREFERRED EMBODIMENTS OF THE INVENTION

More particularly according to the present invention, the following insulating oils are especially suited for incorporation into the subject compositions:

(i) mineral oils;

(ii) polychlorobenzenes, for example trichlorobenzene;

(iii) polychlorotoluenes;

(iv) phthalates and alkyl phthalates, for example di-2-ethylhexyl phthalate;

(v) silicones, for example polydimethylsiloxane;

(vi) arylalkanes and polyarylalkanes such as, for example, the benzyltoluene oligomers described in U.S. Pat. No. 4,523,044;

(vii) chlorinated arylalkanes and polyarylalkanes, for example the product described in European Patent EP 8,251 (alkanes or alkenes substituted by at least one phenyl radical, such phenyl radical itself being substituted by alkyl groups, for example branches or unbranched alkyl benzenes, in particular dodecylbenzene);

(viii) compounds based on phenylxylylethane (PXE) and in particular based on 1-phenyl-1-xylylethane;

(ix) alkylnaphthalenes, for example diisopropylnaphthalene; and (x) isopropylbiphenyl.

The insulating oil (A) may also comprise a mixture of any two or more of the abovementioned materials. All of these materials are purified, for example on absorbents or on clays, and optionally degassed to provide a sufficient resistivity.

The present invention is especially applicable to the products described in U.S. Pat. No. 4,523,044, which are polyarylalkane oligomer compositions including a mixture of two oligomers A and B.

Oligomer A is a mixture of isomers of the formula:

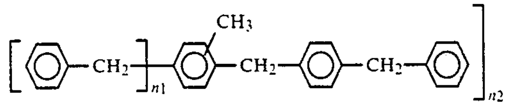

wherein $n_1$ and $n_2=0$, 1 and 2, with the proviso that $n_1+n_2 \leqq 3$, and oligomer B is a mixture of isomers of the formula:

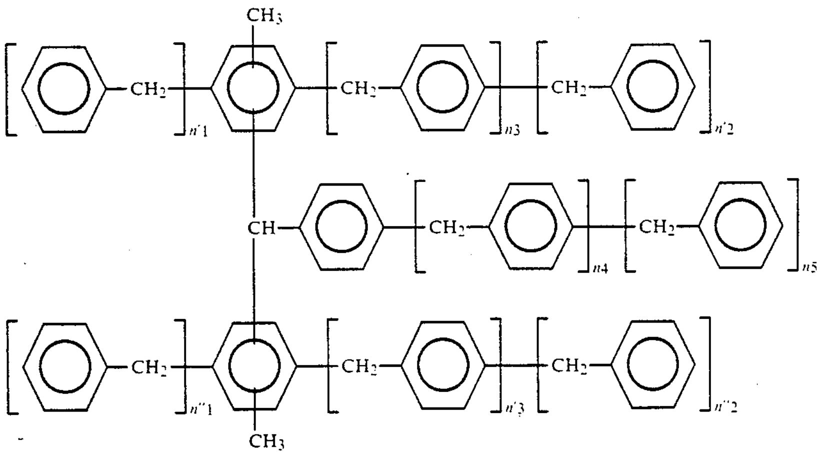

wherein $n'_1$, $n''_1$ and $n_4=0$, 1 and 2; and $n'_2$, $n''_2$, $n_3$ and $n_5=0$ and 1 with the proviso that $n'_1+n''_1+n''_1+n'_2+n''_2+n_3\ n'_3+n_4+n_5 \leqq 2$.

This invention is also particularly applicable to the liquid dielectrics described in EP 8,251, having the formula:

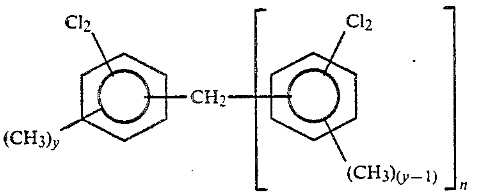

wherein n and y have the value 1 or 2 and which liquid dielectric may be admixed with one or more compounds of the general formula:

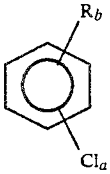

wherein a ranges from 2 to 4 b ranges from 0 to 2, and R is an aliphatic hydrocarbon radical containing from 1 to 3 carbon atoms, such mixture having included therein an acid acceptor of the epoxidized oil or tetraphenyltin type, in an amount ranging from 0.001% to 10%, and preferably from 0.001% to 0.3%.

The compound (B) is an aldehyde containing at least 6 carbon atoms. It may also comprise functional groups other than an aldehyde functional group, but not more than two OH groups. An exemplary such compound is:

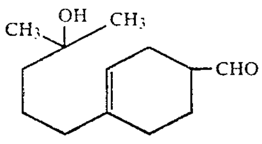

lyral

Compound (B) advantageously comprises at least one phenyl moiety. Exemplary such compounds are:

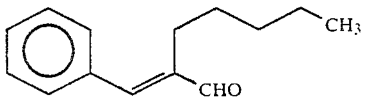

amyl-cinnamaldehyde;

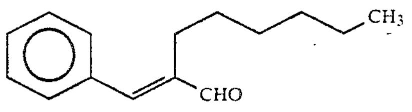

hexyl-cinnamaldehyde;

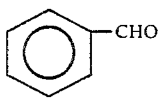

benzaldehyde;

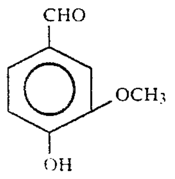

3-methoxy-4-hydroxy-benzaldehyde;

-continued

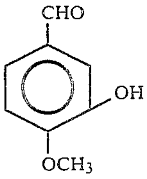

4-methoxy-3-hydroxy-benzaldehyde;

and

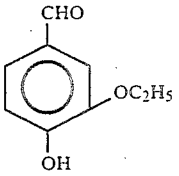

3-ethoxy-4-hydroxy-benzaldehyde.

The latter three compounds are the preferred, particularly 3-ethoxy-4-hydroxybenzaldehyde.

The proportion of (B) in the compositions of the invention may vary over wide limits. The amount of compound (B) is advantageously such that it may constitute up to 1% to 5% by weight of the mixture of (A) and (B). The amount of compound (B), expressed on the same basis, preferably ranges from 50 to 1,000 ppm.

Compound (B) may also comprise a mixture of at least two aldehydes containing at leas t6 carbon atoms in which one mixture of the compounds either may or may not include a phenyl moiety.

The compositions according to the invention may contain antioxidants, epoxides and other additives which are typically incorporated in dielectric liquids.

The present invention also features a process for the formulation of the subject compositions.

The process may entail mere mixing of the constituents. It is advantageous to prepare a master solution of insulating oils (A) containing from 10% to 20% by weight of compound (B) and then to purify it by absorption onto an absorbent clay such as a decolorizing earth, a bentonite, and the like. Purification is continued until a sufficiently high resistivity is provided. This master solution is then employed to formulate the compositions of the invention after being admixed with (A) in the desired proportions.

The present invention also features the use of such compositions in electrical transformers and capacitors.

The compositions according to the invention can also be used as a solvent in the manufacture of pressure-sensitive recording materials such as carbonless copying paper. Such techniqes are described, for example, in FR 2,257,432 (NCR), GB 1,346,364 (Fuji) and FR 2,157,587 (Monsanto).

In order to further illustrate the present invention and the advantages thereof, the following specific examples are given, it being understood that same are intended only as illustrative and in nowise limitative.

EXAMPLES

The change in the loss angle of various liquids over a certain residence time at 100° C. was determined.

The loss angle (tan delta) constitutes one of the important characteristics of a dielectric liquid. It characterizes the electrical conduction of the liquid and must be as low as possible.

Maintaining the liquids at a temperature of 100° C., in the presence of air, results in a progressive, more or less rapid increase in tan delta. The smaller the change, the better the result.

The increase in tan delta during this test is generally due to the appearance of ionic products of oxidation of the liquid (or of its impurities).

Test results (a) reference liquid: a dibenzyltoluene-based product described in Example b 2 of U.S. Pat. No. 4,523,044 and stabilized with 1% by weight of bisphenol A diglycidyl ether. This dielectric is referred to hereinafter as Al;

(b) two compositions according to the invention:

(i) Al+200 ppm of Bl (hereinafter Bl denotes 3-ethoxy-4-hydroxybenzaldehyde);

(ii) Al+200 ppm of Bl+1,000 ppm of di-tert-butyl-para-cresol (antioxident).

Table I below reports the values of tan delta over the course of the residence time of the liquids at 100° C.

TABLE I

| | tan delta 100° C. - 50 Hx × $10^{-4}$ | | |
|---|---|---|---|
| Periods at 100° C. in hours | 0 | 250 | 500 |
| Al | 1.7 | 8.7 | 29 |
| Al + 200 ppm Bl | 1.4 | 8.1 | 26 |
| Al + 200 ppm Bl + 1,000 ppm antioxidant | 3.0 | 7.5 | 21 |

The addition of 200 ppm of Bl did not impair the loss angle of the liquid, even after a prolonged residence at 100° C.

Tests on Capacitors

The tests entailed manufacturing and impregnating model capacitors and subjecting these models to accelerated aging (high voltages and temperatures).

The principal criterion of the test was the number of capacitors which were damaged (breakdowns) during the test.

To study the effect of the presence of Bl in Al, two series of 10 capacitors were manufactures, comprising two smooth polypropylene files 12 μm in thickness (24 μm in total thickness) and a layer of kraft paper, 12 μm in thickness, placed between the two films. The paper had a relative density of 1.0.

The two series of 10 capacitors were impregnated using Al and Al+200 ppm of Bl, respectively.

After impregnation and thermal forming for 80 hours at 100° C., the capacitance and tan delta values of the capacitors under an a.c. voltage of 1,000 volts were measured at a temperature of 85° C.

The following results were obtained:

TABLE II

| | Capacitance values (average) | tan delta values (average) |
|---|---|---|
| Capacitors with Al | 0.25 μF | 7.6 × $10^{-4}$ |
| Capacitors with Al + 200 ppm Bl | 0.25 μF | 8.7 × $10^{-4}$ |

The capacitors were then subjected to aging for 535 hours at 85° C. at 2,700 V (75.0 V/μm).

After this first aging, the capacitance and tan delta values were measured at 85° C. at 1,000 V. The following results were obtained.

TABLE III

| | Capacitance values (average) | tan delta values (average) |
|---|---|---|
| Capacitors with Al | 0.25 μF | 6.1 × $10^{-4}$ |

TABLE III-continued

| | Capacitance values (average) | tan delta values (average) |
|---|---|---|
| Capacitors with Al + 200 ppm Bl | 0.25 μF | 5.9 × $10^{-4}$ |

No capacitor deteriorated during the test at 1,700 V. The test was continued while the voltage was increased to 3,000 volts (83.3 V/μm) in order to further increase the severity of the test. The results of this aging test at 3,000 V were the following:

TABLE IV

| Time period under a voltage of 3,000 V in hours | Number of surviving capacitors | |
|---|---|---|
| | Al | Al + 200 ppm Bl |
| 0 | 10 | 10 |
| 160 | 9 | 10 |
| 521 | 8 | 10 |
| 679 | 8 | 9 |
| 923 | 7 | 9 |
| 1,163 | 7 | 9 |

The results obtained evidenced the superiority of the group containing 3-ethoxy-4hydroxybenzaldehyde (Bl).

Change in tan delta

After 925 hours of aging at 85° C. at 3,000 volts, the tan delta of all remaining capacitors was measured as a function of voltage at a temperature of 85° C.

The following results were obtained:

TABLE V

| | tan δ at 85° C. of the capacitors × $10^{-4}$ | |
|---|---|---|
| Measurement voltage in volts | Impregnant: Al (average of 7 capacitors) | Impregnant: Al + 200 ppm Bl (average of 9 capacitors) |
| 500 | 9.0 | 6.6 |
| 1,000 | 9.4 | 6.8 |
| 2,000 | 10.3 | 7.2 |
| 3,000 | 12.5 | 8.4 |

The tan delta of the group of capacitors with Al containing aldehyde Bl was significantly lower than that of the reference group with Al without such additive (again, the result is the more favorable, the lower the tan delta).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter comprising at least one electrical insulating oil (A) in an amount effective for use as an electrical insulator, and at least one aldehyde (B) in an amount effective to improve the dielectric properties of said oil wherein said aldehyde is 3-methoxy-4-hydroxybenzaldehyde, 4-methoxy-3-hydroxybenzaldehyde, 3-ethoxy-4-hydroxybenzaldehyde or mixtures thereof.

2. The composition of matter as defined by claim 1, said at least one aldehyde (B) comprising 3-methoxy-4-hydroxybenzaldehyde.

3. The composition of matter as defined by claim 1, said at least one aldehyde (B) comprising 4-methoxy-3-hydroxybenzaldehyde.

4. The composition of matter as defined by claim 1, said at least one aldehyde (B) comprising 3-ethoxy-4-hydroxybenzaldehyde.

5. The composition of matter as defined by claim 1, said at least one electrical insulating oil (A) comprising a mineral oil.

6. The composition of matter as defined by claim 1, said at least one electrical insulating oil (A) comprising a polychlorobenzene.

7. The composition of matter as defined by claim 1, said at least one electrical insulating oil (A) comprising a polychlorotoluene.

8. The composition of matter as defined by claim 1, said at least one electrical insulating oil (A) comprising a phthalate or alkyl phthalate.

9. The composition of matter as defined by claim 1, said at least one electrical insulating oil (A) comprising a silicone.

10. The composition of matter as defined by claim 1, said at lest one electrical insulating oil (A) comprising an arylalkane or polyarylalkane.

11. The composition of matter as defined by claim 1, said at least one electrical insulating oil (A) comprising a chlorinated arylalkane or a chlorinated polyarylalkane.

12. The composition of matter as defined by claim 1, said at least one electrical insulating oil (A) comprising a phenylxylylethane.

13. The composition of matter as defined by claim 1, said at least one electrical insulating oil (A) comprising an alkylnaphthalene.

14. The composition of matter as defined by claim 1, said at least one electrical insulating oil (A) comprising an isopropylbiphenyl.

15. The composition of matter as defined by claim 1, said at least one electrical insulating oil (A) having been purified and optionally degassed.

16. The composition of matter as defined by claim 1, comprising from 1% to 5% by weight of said aldehyde (B).

17. The composition of matter as defined by claim 16, comprising from 50 to 1,000 ppm of said aldehyde (B).

18. In an electrical transformer or capacitor, the improvement which comprises, as a dielectric liquid therefor, the composition of matter comprising at least one electrical insulating oil (A) in an amount effective for use as an electrical insulator, and at least one aldehyde (B) in an amount effective to improve the dielectric properties of said oil wherein said aldehyde is 3-methoxy-4-hydroxybenzaldehyde, 4-methoxy-3-hydroxybenzaldehyde, 3-ethoxy-4-hydroxybenzaldehyde or mixtures thereof.

19. In the production of a pressure-sensitive recording material, the improvement which comprises utilizing as a solvent therefor, the composition of matter comprising at least one electrical insulating oil (A) in an amount effective for use as an electrical insulator, and at least one aldehyde (B) in an amount effective to improve the dielectric properties of said oil wherein said aldehyde is 3-methoxy-4-hydroxybenzaldehyde, 4-methoxy-3-hydroxybenzaldehyde, 3-ethoxy-4-hydroxybenzaldehyde. or mixtures thereof.

* * * * *